Jan. 26, 1943.  P. M. HASSLER  2,309,587
DRIVING DEVICE FOR CONVEYERS
Filed Oct. 21, 1939  2 Sheets-Sheet 1
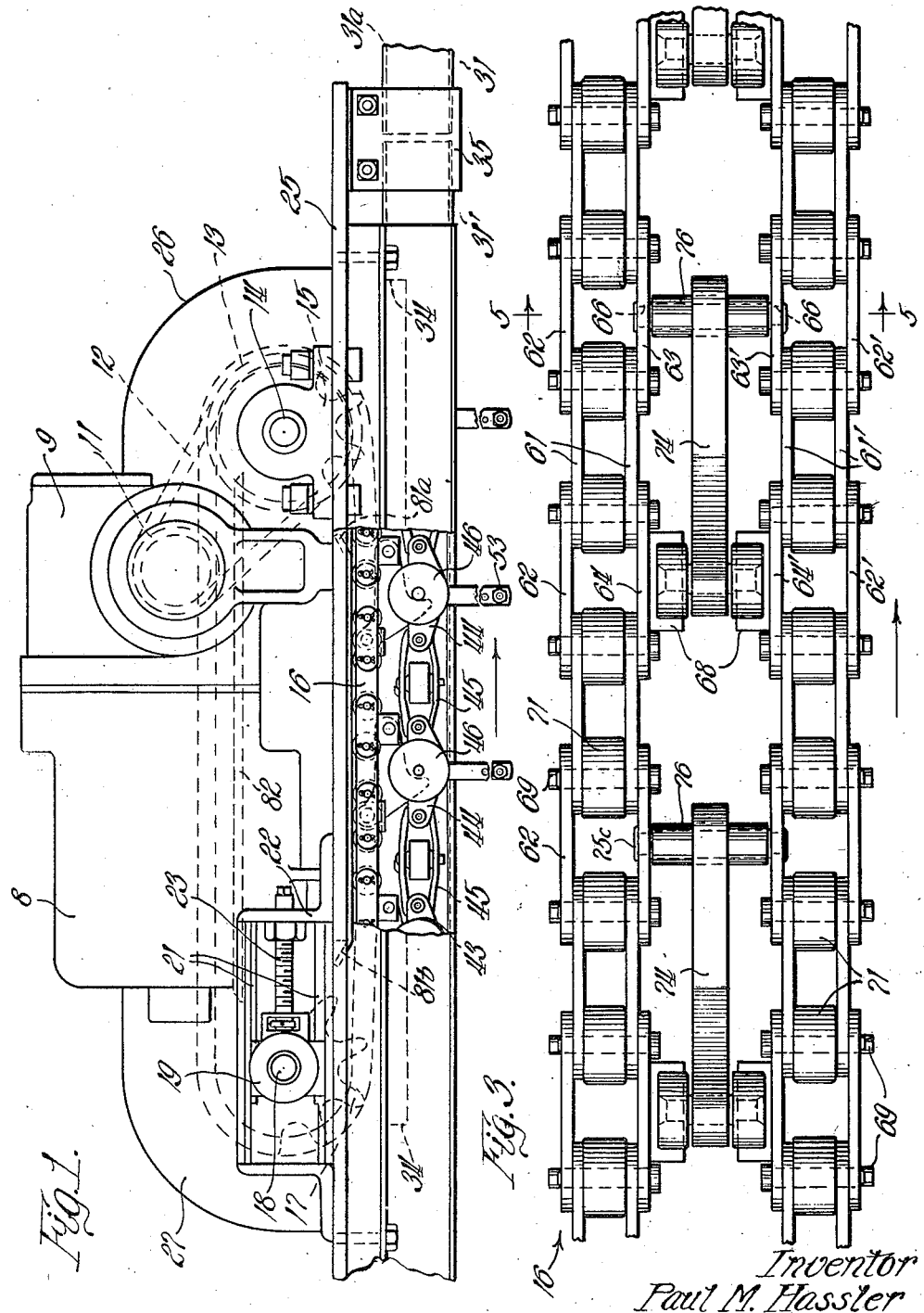
Inventor
Paul M. Hassler

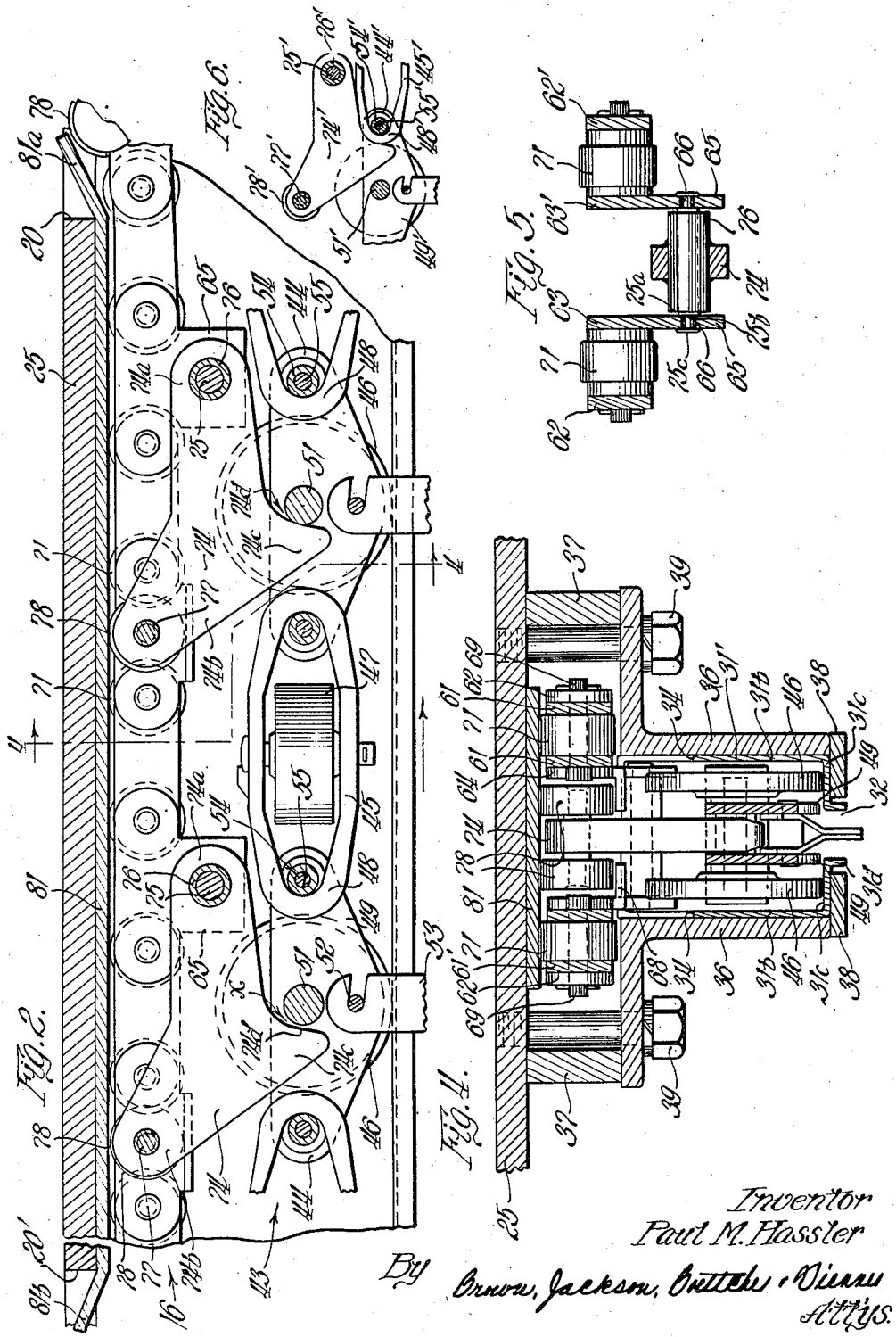

Patented Jan. 26, 1943

2,309,587

UNITED STATES PATENT OFFICE 2,309,587

DRIVING MECHANISM FOR CONVEYERS

Paul M. Hassler, Batavia, Ill., assignor to Richards-Wilcox Manufacturing Company, Aurora, Ill., a corporation of Illinois Application October 21, 1939, Serial No. 300,546

12 Claims. (Cl. 198—203)

The present invention relates to driving mechanisms for conveyers, particularly of the endless chain or link type which is usually adapted to travel along an overhead supporting track. One improved construction of conveyer of this general type is disclosed in my copending application, Serial No. 300,545, filed October 21, 1939. The improved driving mechanism constituting the subject matter of the present application has been devised primarily for driving such type or construction of conveyer, but I wish it to be understood that the utility of the present invention is not limited thereto, but is also applicable to the driving of other types of conveyers.

My improved driving mechanism comprises two relatively short loops of continuous driving chains passing over spaced sprocket wheels arranged in pairs to operate the two driving chain loops in parallel with one rim of the loops traveling in close proximity to the conveyer chain. Driving dogs or fingers are pivotally mounted between the driving chains and arranged to engage and disengage with the conveyer chain in their travel around the loop, thus providing means of transmitting motion to the conveyer chain.

One of the prinicipal features of my new construction is a unique movable mounting of these driving dogs on the driving chain, and a novel arrangement for causing said dogs to move into and out of engagement with the conveyer chain for the purpose of transmitting motion to said conveyer chain. Each driving dog is mounted between and pivotally connected at its front end with both driving chains for swinging movement relative to the driving chains and also relatively to the conveyer chain in a plane common to both chains. Each driving dog is formed with a hooked portion extending rearwardly from the pivoted end and outwardly from the two driving chains, thereby forming a driving surface or shoulder which is adapted to move into the conveyer chain substantially on a line formed by the intersection of a plane passing vertically through the longitudinal axis of the conveyer chain and a horizontal plane through the longitudinal axis of the conveyer chain. The driving force thus becomes effective on a line in common with the forces resisting motion, thereby avoiding eccentric stresses in the conveyer chain and requiring less power to drive the conveyer chain. The rear end of each driving dog carries laterally spaced guide rollers, one on each side thereof, which travel along a stationary guide track adjacent to the power transmitting span of the driving chain, so as to retain the driving surface or shoulder of the driving dog in proper relation to the cooperating driven portion of the conveyer chain. As each driving dog successively assumes the burden of the driving load, the guide rollers of that dog are forced into pressure engagement against said guide track. As each dog approaches the trailing end of said guide track the guide rollers of that dog travel up an upwardly extending slope of the track, thereby effecting a gradual release between the driving dog and the conveyer chain.

Another feature of my driving mechanism is an improved differential relation between the pitch distance which separates the successive driving surfaces or dogs on the driving chain and the pitch distance which separates the successive driven surfaces on the conveyer chain. This longer pitch spacing of the driving dogs cooperates with the above described gradual releasing action of the dogs in that by reason of the longer pitch it is always the leading dog in the direction of drive, i. e., the dog just approaching the upwardly extending trailing end of the guide track, that does the driving, and it is by reason of the gradual releasing action of this leading dog in the movement of its guide rollers up said trailing end of the guide track that gradually transfers or hands the load back to the next succeeding dog.

Other features, objects and advantages of the invention will appear from the following detailed description of one preferred embodiment thereof. In the accompanying drawings illustrating this embodiment:

Figure 1 is a side elevational view of the improved driving mechanism, a portion of the conveyer track being broken away to illustrate the driving relation between the driving dogs and the conveyer chain;

Figure 2 is a fragmentary longitudinal section through the driving chain and through the conveyer chain, showing the manner in which the driving relation is established by the driving dogs;

Figure 3 is a horizontal plan view looking downwardly on the lower run or power transmitting span of the driving chain;

Figure 4 is a transverse sectional view taken approximately on the plane of the line 4—4 of Figure 2;

Figure 5 is a transverse sectional view taken approximately on the plane of the line 5—5 of Figure 3; and Figure 6 is a fragmentary section showing a modified form of drive.

Referring to Figure 1, the fundamental elements of the driving mechanism comprise an electric motor 8 which transmits rotation through suitable reduction gear mechanism indicated at 9 to a sprocket wheel 11 which transmits rotation, by a sprocket chain 12, to a larger sprocket wheel 13 mounted on the transversely extending driving shaft 14 disposed at one end of the mechanism. Secured to this driving shaft are two laterally spaced driving sprockets 15 over which pass the driving chains 16. The other end of the chain loop passes around two idler sprockets 17 mounted on a transverse shaft 18 disposed at the other end of the driving mechanism. To provide for taking up any undesirable slack in the driving chain 16, the shaft 18 is mounted in bearings 19 which are capable of horizontal shifting movement between the upper and lower ways 21 of a guide frame 22 at each end of the shaft. An adjusting screw 23 functions as an adjustable spacing strut between each slidable bearing 19 and the inner end of its associated frame 22. The electric motor 8, reduction gearing 9, drive shaft 14, frames 15, etc., are all mounted on a common base plate 25, so that all of the parts of the driving mechanism are joined in a unit assembly. If desired, the sprocket chain driving mechanism 11, 12 and 13, and the main driving chains 16, together with its supporting sprocket wheels 15 and 17, may be enclosed within suitable protecting housing portions 26 and 27.

The above described driving unit can be located at any desired point in the loop or circuit of the conveyer track, this location then being the driving station for the conveyer chain of the system. As fully disclosed in my aforementioned copending application, the conveyer track, designated 31 in its entirety, is preferably of box-shaped cross section, as best shown in Figure 4, comprising the top wall 31a (Fig. 1), the vertical side walls 31b, and the inwardly extending bottom walls or flanges 31c. The latter define load supporting runways on opposite sides of the centrally disposed slot 32 which extends longitudinally of the bottom of the track. Downwardly extending marginal flanges 31d may be formed along the opposite sides of the slot, although these flanges are not essential. The track sections are preferably constructed from sheet metal stock, and may be supplied in sections curved horizontally and vertically in either direction. As disclosed in my above-mentioned copending application, the conveyer track may be installed for operation in inverted position or to either side, and the same drive unit may be used for operation of the track, either in an inverted position or positioned upon the side thereof. A special section of track, designated 31', is secured below the mounting base 25 of the driving unit, this special section corresponding to a stock section except that a relatively long opening 34 (Fig. 1) is cut down through the top and side walls of this section to provide the necessary opening for the driving chain to pass down into driving relation to the conveyer chain. Joint brackets 35 are secured to the underside of the mounting base 25 and join the ends of this special section 31' with the coextensive standard sections 31.

This special section 31' of trolley track is reinforced and braced directly below the driving mechanism by the angle bars 36 and side plates 37, best illustrated in Figure 4. The vertical flanges of the angle bars 36 abut against the side walls 31b of the trolley track, and the lower edges of these flanges have bars 38 welded thereto, these bars extending inwardly under the runway flanges 31c of the trolley track. The horizontal flanges of the angle bars 36 project outwardly from the track and abut against the lower edges of the horizontal plates or strips 37, which in turn abut against the underside of the mounting base 25. This entire reinforcing assembly is secured to said mounting base by the screws 39 which pass up through the horizontal flanges of the angle bars and thread into tapped holes in the mounting base. The base plate 25 has appropriate openings 20, 20' therein which accommodate the sprocket wheels 15, 17 and the travel of the drive chains 16, 16a through the power transmitting run or span of the chain disposed below said base plate.

The entire conveyer chain, designated 43, is made up of an alternating series of identical links 44 and identical connecting links 45. As fully described in my aforementioned copending application, the alternating links 44 are provided with two laterally spaced vertical wheels 46 which ride upon the bottom runways 31c of the supporting track. Each connecting link member 45 carries a horizontally disposed guide roller 47 which is of a diameter only slightly smaller than the inside width of the track 31 but greater than the overall width of alternating links 44, so that this horizontal wheel is adapted to have rolling contact with the side walls 31b of the track and prevent contact of the vertically wheeled links 44 with said side walls. The frame structure of each vertically wheeled link member 44 comprises two laterally disposed side plates 49, which are preferably identical. The two side plates are assembled over the ends of the wheel axle 51 and over the ends of the attachment or fastener pin 52 by which means the load attachment member 53 is fastened to the chain. By constructing each alternate link frame of the spaced side plates 49, an opening extending into the link frame is provided, such openings in the successive alternate links receiving the projecting portions of the driving dogs carried by driving chains 16, 16a. The transverse axles 51 extending through the side plates 49 constitute a surface against which the driving dogs are adapted to engage, or, as shown in Fig. 6, the driving dogs 74' may enter the opening between side plates 49' ahead of transverse axles 51' and engage the end loop portions 48' of each connecting link 45' which may also constitute a surface against which these driving dogs are adapted to engage. The end loop portions 48 of each alternate connecting link 45 extend into the vertical space between the side plates 49 of each alternate link and engage over rotatable coupling sleeves 54, which are mounted on transverse pins 55 extending through the end portions of the link side plates 49. The looped end portion 48 and the coupling sleeve 54 are capable of relative angulation in the vertical plane and in the horizontal plane, the coupling sleeve being of curved hourglass configuration for facilitating relative angular movement in the horizontal plane. These details, together with the manner in which the load-attaching members 53 are detachably coupled to the transverse hanger pins 52, are fully described in my copending application above referred to.

Referring now to the construction of the driving chains 16, 16a it will be seen from Figure 3 that they comprise two duplicate roller chains which are maintained in spaced, side-by-side relationship for supporting the driving dogs therebetween. The two identical chains comprise pairs of inner links 61, 61', which serve to join pairs of outer links 62, 63 and 62', 63' with other alternate pairs of outer links 62, 64 and 62', 64'. The opposing links 63, 63' of the two chains are of duplicate formation, each comprising a downwardly extending lug or ear 65 (Figure 2), having an aperture 66 therein for pivotally supporting the driving dogs. Similarly, the opposing links 64, 64' of the two chains are of duplicate construction, each comprising flanges which are bent inwardly to form ledges or shelves 68 on which the roller ends of the driving dogs are adapted to rest. These various pairs of inner and outer links of said roller chains are pivotally connected together by the pivot pins 69 on which the chain rollers 71 are mounted. The teeth of the pairs of sprocket wheels 15, 15 and 17, 17 are engaged in the two chains between these rollers 71.

The driving dogs or lugs 74 each comprise a forwardly extending portion 74a which is apertured to receive a transverse pivot pin 75. As shown in Figure 5, said pin has reduced ends 75a which extend outwardly through the apertures 66 in the links 63, 63', these reduced ends forming abutment shoulders 75b which abut against the inner surfaces of the ears 65 projecting downwardly from the chain links 63, 63'. The outer extremities of said reduced ends are riveted or crimped over on the outer sides of said links, as indicated at 75c. Freely rotatable on each pin 75 is a sleeve 76 which passes through the transverse aperture in the forward portion 74a of the associated driving dog. The dog is preferably welded to the sleeve so that the sleeve functions as a wide span bearing member for the dog, and the length of the sleeve is slightly less than the span between the links 63, 63' for free rotation on the pin 75. The riveted attachment of each pin 75 to the opposite links 63, 63' results in each pin 75 functioning as a fixed crosstie or spacer which maintains the two roller chains at a constant spacing and compels concurrent forward movement of both.

The rearwardly extending portion 74b of each driving dog carries a transversely extending pin 77 on the ends of which revolvable rollers 78 are mounted, one on each side of the dog. When the driving dogs are moving idly through the first part of the power transmitting portion of their path, just prior to their engagement with the conveyer chain, the aforesaid rollers 78 rest on the inwardly extending shoulders or ledges 68, 68 carried by the driving chain. However, as soon as the driving load is placed upon each successive dog, the dog is oscillated upwardly to bring the rollers 78 to bear against a stationary guide track 81 which lies below the mounting base 25 of the driving unit. As shown in Figure 2, the trailing end of this guide plate 81 slopes upwardly at 81a into the opening 20 in the mounting plate 25, this inclined portion 81a functioning as a receding cam or track surface which determines the point at which the driving dogs release their driving engagement with the conveyer chain 43. Preferably, the opposite or leading edge of this guide track 81 is inclined upwardly at 81b into the opening 20' in the supporting base 25. As shown in Figure 4, the rollers 71 of the drive chain are also adapted to bear against the under surface of the guide plate 81 in their travel beneath the base plate 25. Extending beneath the top run of the drive chain loop is another guide plate indicated in dotted lines at 82 in Figure 1. In the travel of the driving dogs through this top run of the loop the rollers 78 ride on this upper guide plate 82 and thus prevent the dogs from swinging down through the chain to positions which would interfere with their proper travel around the idler sprocket wheels 17, 17.

Referring again to Figure 2, it will be seen that each driving dog 74 is formed with a tapered lug portion 74c which is adapted to enter between the side plates of each link 44 directly in rear of the axle 51. The curved forward edge 74d of this lug portion constitutes the driving surface of the dog, such driving surface being adapted to engage with the driven surface (the axle) 51 of the link. It will be noted that this driving surface 74d, at the point where it contacts the driven surface 51, extends at an angle to the line of draft pull, represented by a line drawn from the axis of the pivotal center 75 of the dog to the point of intersection of the driving and driven surfaces. Thus, as long as the dog is transmitting a driving force to the conveyer chain, there is a reaction pressure present which holds the dog rollers 78 pressed upwardly against the guide track 81, as illustrated by the position of the right hand dog in Figure 2. It will be noted that the same reactions as described above occur if the driving dog is allowed to enter the link 44' ahead of axle 51' and contact the loop portion 48' of connecting link 45'.

As previously remarked, the parts are so proportioned that the pitch distance or spacing from the pivot center 75 of each driving dog to the pivot center 75 of the next driving dog is slightly greater than the pitch distance of spacing between the wheel axis 51 of each alternating link and the wheel axis 51 of the next succeeding alternate link. By reason of this differential pitch or spacing, it is always the leading dog 74 in the direction of drive that does the driving, the succeeding dogs being spaced slightly out of contact with the driven surfaces 51 of their respective links, as indicated at x in Figure 2. Thus, in the operation of the drive chain, when the rollers 78 which hold the driving dog depressed reach the upwardly inclined end portion 81a of the guide track 81 and start to travel upwardly along this slope, they permit the driving dogs to swing upwardly for allowing the conveyer chain to drop back slightly relatively to the driver chain. This immediately brings the driven surface 51 of the next succeeding link up against the driving surface 74d of the next succeeding dog, and thus the load of the conveyer chain is transferred or handed back to the next succeeding dog. This is effected very gradually and smoothly, without shock, by reason of the gradual upward slope of the cam track portion 81a, the angular relation between the driving surface 74d and the line of draft acting downwardly from the pivot axis 75, together with the relatively small spacing distance x existing between the next succeeding driving dog and its associated trolley.

It will be noted that as the pivot 75 of driving dog 74 is a distance ahead of driving surface 74d, the latter surface moves backwardly as the pusher dog 74 swings upwardly and pressure against the driven surface of the conveyer chain is thus released without any sliding action between the two surfaces, thereby avoiding friction and wear of these surfaces.

Attention is also directed to the fact that by having the driving dogs 74 apply their propelling force to the wheel axles 51 or to the rounded end portions 48, they are applying their force on a line formed by the intersection of a horizontal plane passing through the axis of the vertical wheel axles 51 and the axis of the connecting pins 55 with a vertical plane in which lie the axis of the axles of the horizontal wheels 47, said planes passing substantially through the center of the conveyer chain links 44 and 45, such being the line of tension acting throughout the entire conveyer chain. Hence, the application of the propelling force to these surfaces disposed in said line of tension avoids rocking, tilting movement, or eccentric forces being imparted to any part of the conveyer chain.

While I have illustrated and described what I regard to be the preferred embodiment of my invention, nevertheless it will be understood that such is merely exemplary and that numerous modifications and rearrangements may be made therein without departing from the essence of the invention.

I claim:

1. In combination, a conveyer comprising a substantially closed trolley track comprising side, top and bottom walls including a slot extending longitudinally of the track in one wall thereof, an endless conveyer chain traveling within said track comprising alternate links provided with supporting wheels and connecting links provided with guide wheels, each of said alternate links comprising spaced side plates, an axle extending through said side plates, said supporting wheels being mounted on said axle on the outer sides of said side plates, together with a load-attaching member positioned transversely between said side plates and extending through said longitudinally extending slot, and driving mechanism for said conveyer chain comprising an endless driving chain looped with one run of the loop disposed adjacent to said supporting track, said track having an opening in a wall thereof in line with said run, driving dogs pivotally mounted on said driving chain and adapted to impart propelling force to the conveyer chain by engagement with said alternate wheeled links at points between the laterally spaced side plates of said links, and a stationary guide track adjacent to the latter run of said driving chain for controlling the motion of said driving dogs into and out of engagement with said links.

2. In combination, a chain conveyer of the class described comprising alternate wheeled links and connecting wheeled links coupled together for relative vertical and horizontal articulation, said alternate links having vertical wheels and said connecting links having horizontal wheels, each of said alternate wheeled links having a load attachment member secured thereto, driving mechanism for driving said chain conveyer comprising a looped driving chain having one run of the loop extending substantially parallel with said conveyer, driving dogs pivotally supported on said driving chain and adapted to apply propelling force to said conveyer chain at points substantially in line with the tension line of the conveyer chain and the axes of said vertical wheels, a guide track disposed adjacent to said driving chain, driving surfaces on said dogs, driven surfaces on said conveyer adapted to be engaged by said driving surfaces, said driving surfaces having a different pitch spacing than said driven surfaces whereby to effect a predetermined transfer of the driving load from dog to dog, and guide rollers carried by said driving dogs and adapted to roll along said guide track for holding the driving surfaces of said driving dogs in power transmitting engagement with the driven surfaces of said conveyer, the trailing end of said guide track having a slope which recedes from said conveyer, said receding slope functioning through the instrumentality of said guide rollers to effect a gradual releasing action between said driving dogs and the conveyer.

3. In combination, a chain conveyer of the class described comprising alternate wheeled links and connecting wheeled links coupled together for relative vertical and horizontal articulation, said alternate links having vertical wheels and said connecting links having horizontal wheels, load propelling members connected to a plurality of said links, driving mechanism for driving said chain conveyer comprising a driving chain traveling through a closed loop which has one run extending substantially parallel with said conveyer, driving dogs pivotally supported at their front ends on said driving chain and carrying guide rollers at their rear ends, a guide track having a relatively straight portion disposed adjacent to the latter run of said driving chain and along which the guide rollers on said dogs are adapted to run, and a driving surface on each of said dogs disposed intermediate the pivotally supported front end and the roller supporting rear end of the dog and adapted to engage with a coacting driven surface on said conveyer, said surfaces being so related that the transmission of propelling force therethrough acts on said conveyer chain at points substantially in line with the tension line of the conveyer chain and the axes of said vertical wheels, and also holds said guide rollers pressed against said guide track, said guide track having a slope at its trailing end which recedes from the relatively straight portion of the track and from the adjacent run of said conveyer and which permits the successive dogs to swing with a relatively gradual motion to drive releasing positions.

4. In driving mechanism for an endless chain conveyer of the class described, the combination of a driving chain traveling through a closed loop which has one run extending substantially parallel with said conveyer, driving dogs pivotally supported at their front ends on said driving chain, guide rollers mounted on the rear ends of said driving dogs, driving surfaces on said dogs projecting downwardly from the latter run of said driving chain, driven surfaces on said conveyer adapted to be engaged by said driving surfaces, and a guide track having a relatively straight portion disposed adjacent to the latter run of said driving chain and along which the guide rollers on said dogs are adapted to run, the driving surfaces on said dogs having a greater pitch spacing than the driven surfaces on said conveyer, whereby it is always the leading dog in the direction of drive along said run that does the actual driving, said driving and driven surfaces being so related that their point of contact lies in a plane adjacent to the horizontal plane of the pivotal axis of said dogs, whereby the transmission of propelling force through said surfaces holds said guide rollers pressed against said guide track, said guide track having a slope at its trailing end which recedes from said relatively straight portion of the track and from the adjacent run of the conveyer and which permits each leading dog along said lower run of the driving chain to effect a gradual releasing action with the conveyer so as to transfer the propelling load back to the next succeeding dog without shock or vibration.

5. In combination, a chain conveyer of the class described comprising alternate wheeled links and connecting wheeled links coupled together for relative vertical and horizontal articulation, said alternate links having vertical wheels and said connecting links having horizontal wheels, driving mechanism for driving said chain conveyer comprising a looped driving chain having one run of the loop extending substantially parallel with said conveyer, driving dogs pivotally supported on said driving chain on transverse pivot axes permitting inward and outward movement of said dogs relatively to said driving chain for effecting power transmitting engagement with said conveyer chain at points substantially in line with the tension line of the conveyer chain and the axes of said vertical wheels, a guide track disposed adjacent to said driving chain, guide rollers carried by said driving dogs and adapted to roll along said guide track for holding the successive driving dogs in power transmitting engagement with said conveyer, the trailing end of said guide track having a slope which inclines away from the conveyer and which functions through the instrumentality of said guide rollers to effect a gradual releasing action between said driving dogs and the conveyer, and supporting surfaces carried by said driving chain to the rear of the pivot axes of said driving dogs and against which portions of said driving dogs are adapted to bear during the travel of said dogs around the ends of the chain loop for preventing outward displacement of said dogs from their proper positions relatively to said driving chain.

6. In driving mechanism for an endless chain conveyer of the class described, the combination of a looped driving chain having one run of its loop extending substantially parallel with said conveyer, said driving chain comprising two roller chain sections traveling in side by side relation, driving dogs pivotally supported between said chain sections and adapted for movement into and out of power transmitting engagement with said conveyer, a guide track disposed adjacent to said driving chain, guide rollers carried by said driving dogs and adapted to roll along said guide track for holding the successive driving dogs in power transmitting engagement with said conveyer, the trailing end of said guide track having a receding slope which functions through the instrumentality of said guide rollers to effect a gradual releasing action between said driving dogs and the conveyer, and shoulders projecting inwardly from the inner sides of said roller chain sections and adapted to form supporting ledges against which said guide rollers can bear for limiting the outward movement of said driving dogs relatively to said driving chain.

7. In combination, a chain conveyer of the class described comprising alternate wheeled links and connecting wheeled links coupled together for relative vertical and horizontal articulation, said alternate links having vertical wheels and said connecting links having horizontal wheels, each of said alternate wheeled links having a load attachment member secured thereto, and driving mechanism for driving said chain conveyer comprising power transmitting members adapted to apply propelling force to said conveyer chain at points substantially in line with the tension line of the conveyer chain and the axes of said vertical wheels.

8. In driving mechanism for an endless chain conveyer of the class described, the combination of a looped driving chain having one run of its loop extending substantially parallel with said conveyer, said driving chain comprising two roller chain sections traveling in side by side relation, driving dogs pivotally supported between said chain sections and comprising driving surfaces adapted for movement into and out of power transmitting engagement with driven surfaces on said conveyer, the driving surfaces on said dogs having a greater pitch spacing than the driven surfaces on said conveyer, a guide track disposed adjacent to said driving chain, guide rollers carried by said driving dogs and adapted to roll along said guide track for holding the successive driving dogs in power transmitting engagement with said conveyer, the ends of said guide track having a receding slope which functions through the instrumentality of said guide rollers to effect a gradual engagement with and disengagement from the conveyer chain for imparting motion to said conveyer chain, said driving dogs being pivotally attached to the said driving chain at a point ahead of the driving contact surface of said driving dogs, allowing said surface to move backwardly and away from the contact surface on the conveyer chain and permitting a gradual releasing action without dragging the two surfaces together while under pressure.

9. In combination, a chain conveyer of the class described comprising alternate wheeled links and connecting wheeled links coupled together for relative vertical and horizontal articulation, said alternate links having vertical wheels and said connecting links having horizontal wheels, driving mechanism for driving said chain conveyer comprising a looped driving chain having one run of the loop extending substantially parallel with said conveyer, driving dogs pivotally supported at their front ends on said driving chain and adapted to apply propelling force to said conveyer chain at points substantially in line with the tension line of the conveyer chain and the axes of said vertical wheels, a guide track disposed adjacent to said driving chain, guide rollers carried by the rear ends of said driving dogs and adapted to roll along said guide track for holding the successive driving dogs in power transmitting engagement with said conveyer, and driving surfaces on said dogs located between the pivotally supported front ends and the roller supporting rear ends of said dogs for effecting said power transmitting engagement with said conveyer.

10. In driving mechanism for a conveyer of the class described, the combination of a looped driving chain having one run of the loop extending substantially parallel with said conveyer, driving dogs pivotally supported at their front ends on said driving chain, a guide track disposed adjacent to said driving chain, guide rollers carried at the rear ends of said driving dogs and adapted to roll along said guide track for holding the successive driving dogs in power transmitting engagement with said conveyer, driving surfaces on said dogs located approximately midway between the pivotally supported front ends of said dogs and the guide rollers at the rear ends of said dogs, and driven surfaces on said conveyer adapted to be engaged by said driving surfaces, the driving surfaces on said dogs having a greater pitch spacing than the driven surfaces on said conveyer, whereby it is always the leading dog in the direction of drive along the driving run of the drive chain that does the actual driving.

11. In driving mechanism for a conveyer of the class described, the combination of a looped driving chain having one run of the loop extending substantially parallel with said conveyer, driving dogs pivotally supported at their front ends on said driving chain, a guide track disposed adjacent to said driving chain, guide rollers carried at the rear ends of said driving dogs and adapted to roll along said guide track for holding the successive driving dogs in power transmitting engagement with said conveyer, driving surfaces on said dogs located approximately midway between the pivotally supported front ends of said dogs and the guide rollers at the rear ends of said dogs, and driven surfaces on said conveyer adapted to be engaged by said driving surfaces, the driving surfaces on said dogs having a greater pitch spacing than the driven surfaces on said conveyer, whereby it is always the leading dog in the direction of drive that does the actual driving, the trailing end of said guide track having a slope which recedes from said conveyer, said receding slope functioning through the instrumentality of said guide rollers to effect a gradual releasing action between said driving dogs and the conveyer.

12. In combination, a chain conveyer of the class described comprising alternate wheeled links and connecting wheeled links coupled together for relative vertical and horizontal articulation, said alternate links having vertical wheels and said connecting links having horizontal wheels, driving mechanism for driving said chain conveyer comprising a looped driving chain having one run of the loop extending substantially parallel with said conveyer, driving dogs pivotally supported on said driving chain on transverse pivot axes permitting inward and outward movement of said dogs relatively to said driving chain for effecting power transmitting engagement with said conveyer chains at points substantially in line with the tension line of the conveyer chain, a guide track disposed adjacent to said driving chain, guide rollers carried by said driving dogs and adapted to roll along said guide track for holding the successive driving dogs in power transmitting engagement with said conveyer, and supporting surfaces carried by said driving chain to the rear of the pivot axes of said driving dogs and against which portions of said dogs are adapted to bear during the travel of said dogs around the ends of the chain loop for preventing outward displacement of said dogs from their proper positions relatively to said driving chain.

PAUL M. HASSLER.